United States Patent
Ishikura

(10) Patent No.: US 7,803,478 B2
(45) Date of Patent: Sep. 28, 2010

(54) POWER OUTPUT APPARATUS AND METHOD OF SETTING SECONDARY BATTERY

(75) Inventor: Makoto Ishikura, Toyota (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 12/298,955

(22) PCT Filed: May 1, 2007

(86) PCT No.: PCT/JP2007/059293

§ 371 (c)(1),
(2), (4) Date: Oct. 29, 2008

(87) PCT Pub. No.: WO2007/129632

PCT Pub. Date: Nov. 15, 2007

(65) Prior Publication Data

US 2009/0258280 A1    Oct. 15, 2009

(30) Foreign Application Priority Data

May 10, 2006    (JP) .............................. 2006-131890

(51) Int. Cl.
*H01M 10/44*    (2006.01)
*H01M 2/26*    (2006.01)
*H01M 2/28*    (2006.01)
*F02N 7/00*    (2006.01)
*B60K 1/00*    (2006.01)

(52) U.S. Cl. ..................... 429/50; 429/121; 123/179.3; 180/65.1; 180/65.3

(58) Field of Classification Search ................. 429/120; 180/65.1, 65.3; 127/179.3; 123/179.3
See application file for complete search history.

(56) References Cited

U.S. PATENT DOCUMENTS

| 5,819,187 A | 10/1998 | Sato et al. |
| 2001/0003024 A1 | 6/2001 | Nemoto |
| 2003/0064854 A1* | 4/2003 | Kotani ........................... 477/3 |

(Continued)

FOREIGN PATENT DOCUMENTS

JP    06-295725 A    10/1994

(Continued)

OTHER PUBLICATIONS

Horiba et al., Journal of Power Source, 119-121 (2003) 893-896.*

*Primary Examiner*—Jennifer K Michener
*Assistant Examiner*—Eli S Mekhlin
(74) *Attorney, Agent, or Firm*—Sughrue Mion, PLLC

(57) ABSTRACT

In a power output apparatus of the invention, a battery 36 is constructed by a lithium ion battery satisfying a first requirement of $Sb/Pm2max>0.09$ $(m^2/kW)$ as a relation of a total electrode area Sb of the battery to a rated output (maximum output) Pm2max of a motor MG2 in power operation and a second requirement of $Sb/(|Pm1min+Pm2min|)>0.04$ $(m^2/kW)$ as a relation of the total electrode area Sb of the battery to a rated output Pm1min of a motor MG1 in regenerative operation and a rated output Pm2min of the motor in regenerative operation. The lithium ion battery satisfying the first requirement and the second requirement ensures sufficient exertion of the drive characteristics of the motor MG2 and the power generation characteristics of both the motors MG1 and MG2.

9 Claims, 4 Drawing Sheets

U.S. PATENT DOCUMENTS

2004/0099234 A1 * 5/2004 Tamai et al. ............. 123/179.3

FOREIGN PATENT DOCUMENTS

| JP | 08-331704 A | 12/1996 |
| --- | --- | --- |
| JP | 09-233608 A | 9/1997 |
| JP | 11-224693 A | 8/1999 |
| JP | 2001-167800 A | 6/2001 |
| JP | 2004-047332 A | 2/2004 |
| JP | 2004-288405 A | 10/2004 |
| JP | 2006-009601 A | 1/2006 |

* cited by examiner

TOTAL ELECTRODE AREA / RATED OUTPUT OF MOTOR MG2
IN POWER OPERATION (m²/kW)

TOTAL ELECTRODE AREA / SUM OF RATED OUTPUTS OF MOTORS MG1 & MG2 IN
RENEGERATIVE OPERATION (m²/kW)

POWER OUTPUT APPARATUS AND METHOD OF SETTING SECONDARY BATTERY

TECHNICAL FIELD

The present invention relates to a power output apparatus and a method of setting a secondary battery.

BACKGROUND ART

One proposed structure for a secondary battery used in power output apparatuses is a design satisfying a relation of WHC/T≦50 (mm), where H, T, and W respectively denotes a width, a lamination height, and a depth of a flat electrode assembly, and C represents a clearance between a flat face of the flat electrode assembly and an inner wall of a rectangular container (see, for example, Patent Document 1). One typical example of such a secondary battery is a lithium ion battery satisfying the above relation. The size of the clearance ensuring the favorable results is selectable according to this relation.

Patent Document 1: Japanese Patent Laid-Open No. 2004-47332

DISCLOSURE OF THE INVENTION

The secondary battery used in the power output apparatus is desired to exert the sufficient functions corresponding to the output characteristics of a motor and a generator included in the power output apparatus and the response characteristics of an internal combustion engine and other power sources. Mounting a secondary battery of excessively high performance on a vehicle may, however, lower the acceleration performance of the vehicle, due to the high weight of the high-performance secondary battery. Application of a motor and a generator of excessively high performances to such a vehicle to improve the lowered acceleration performance may undesirably lower the fuel consumption of the vehicle. Mounting a secondary battery of insufficient performance on the vehicle may, on the other hand, restrict the performances of the motor and the generator. Application of the secondary battery having appropriate performances is thus required.

An object of the present invention is to provide a power output apparatus and a method of setting a secondary battery with a secondary battery having performances corresponding to performances of a motor and a generator.

The present invention accomplishes at least part of the object mentioned above and the other relevant demands by the following configurations applied to the power output apparatus and the method of setting the secondary battery.

A first power output apparatus according to one aspect of the present invention is configured to output power to at least one driveshaft, the power output apparatus comprising: at least one motor constructed to enable power input and power output from and to the at least one driveshaft; and a secondary battery designed to enable transmission of electric power to and from any of the at least one motor and to have an electrode satisfying a condition that a ratio of a total electrode area to a sum of rated output of all the at least one motor in power operation is not lower than a first predetermined ratio.

The first power output apparatus according to this aspect of the invention is equipped with the secondary battery having the electrode satisfying the condition that the ratio of the total electrode area to the sum of rated output of all the at least one motor in power operation is not lower than the first predetermined ratio. The secondary battery has the performance corresponding to the drive performance of the motor and thus ensures sufficient exertion of the drive performance of the motor.

A second power output apparatus according to another aspect of the present invention is configured to output power to at least one driveshaft, the power output apparatus comprising: at least one motor constructed to enable power input and power output from and to the at least one driveshaft; a power source constructed to output power; at least one generator constructed to enable power generation by using the output power of the power source, while the motor outputs power to the driveshaft; and a secondary battery designed to enable transmission of electric power to and from any of the at least one motor and the at least one generator and to have an electrode satisfying a condition that a ratio of a total electrode area to a total of a sum of rated output of all the at least one motor in regenerative operation and a sum of rated output of all the at least one generator is not less than a second predetermined ratio.

The second power output apparatus according to this aspect of the invention is equipped with the secondary battery having the electrode satisfying the condition that the ratio of the total electrode area to the total of the sum of rated output of all the at least one motor in regenerative operation and the sum of rated output of all the at least one generator is not less than the second predetermined ratio. The secondary battery has the performance corresponding to the power generation performances of the motor and the generator and thus ensures sufficient exertion of the power generation performances of the motor and the generator.

A third power output apparatus according to another aspect of the present invention is configured to output power to at least one driveshaft, the power output apparatus comprising: at least one motor constructed to enable power input and power output from and to the at least one driveshaft; a power source constructed to output power; at least one generator constructed to enable power generation by using the output power of the power source, while the motor outputs power to the driveshaft; and a secondary battery designed to enable transmission of electric power to and from any of the at least one motor and the at least one generator and to have an electrode satisfying a condition that a ratio of a total electrode area to a sum of rated output of all the at least one motor in power operation is not less than a first predetermined ratio and a condition that a ratio of the total electrode area to a total of a sum of rated output of all the at least one motor in regenerative operation and a sum of rated output of all the at least one generator is not less than a second predetermined ratio.

The third power output apparatus according to this aspect of the invention is equipped with the secondary battery having the electrode satisfying the condition that the ratio of the total electrode area to the sum of rated output of all the at least one motor in power operation is not less than the first predetermined ratio and the condition that the ratio of the total electrode area to the total of the sum of rated output of all the at least one motor in regenerative operation and the sum of rated output of all the at least one generator is not less than the second predetermined ratio. The secondary battery has the performances corresponding to the drive performance of the motor and the power generation performances of the motor and the generator and thus ensures sufficient exertion of the drive performance of the motor as well as the power generation performances of the motor and the generator.

In one preferable application of either of the first and the third power output apparatuses according to the above aspects of the invention, the first predetermined ratio is set based on an amount of electric power per unit area of the electrode in discharge from the secondary battery at a maximum rated output. In the case of a lithium ion battery adopted for the secondary battery, the first predetermined ratio may be 0.04 ($m^2$/kW). In one preferable application of either of the second and the third power output apparatuses according to the above aspects of the invention, the second predetermined ratio is set based on an amount of electric power per unit area of the electrode in charge into the secondary battery at a maximum rated output. In the case of a lithium ion battery adopted for the secondary battery, the second predetermined ratio may be 0.09 ($m^2$/kW).

In one preferable embodiment of the invention, either of the second and the third power output apparatuses further has a three shaft-type power input output assembly connected with three shafts, an output shaft of the power source, the driveshaft, and a rotating shaft of the generator, and designed to input and output power from and to a residual shaft based on powers input from and output to any two shafts among the three shafts.

Any of the first through the third power output apparatuses according to the invention may be mounted on a vehicle as a power source for outputting power for driving the vehicle. In this application, the driveshaft of the power output apparatus is linked with an axle of the vehicle. The vehicle equipped with one of the first through the third power output apparatuses has the similar effects and advantages to those of the corresponding one of the first through the third power output apparatuses discussed above. For example, such a vehicle is equipped with the secondary battery having the performance corresponding to the drive performance of the motor or with the secondary battery having the performance corresponding to the power generation performances of the motor and the generator.

A first method according to another aspect of the present invention is a method of setting a secondary battery in a power output apparatus, where the power output apparatus includes: at least one motor constructed to enable power input and power output from and to at least one driveshaft; and the secondary battery designed to enable transmission of electric power to and from any of the at least one motor. The method sets a performance of the secondary battery to have an electrode satisfying a condition that a ratio of a total electrode area to a sum of rated output of all the at least one motor in power operation is not lower than a first predetermined ratio.

The first method of setting the secondary battery according to this aspect of the invention sets the performance of the secondary battery to have the electrode satisfying the condition that the ratio of the total electrode area to the sum of rated output of all the at least one motor in power operation is not lower than the first predetermined ratio. The secondary battery has the performance corresponding to the drive performance of the motor and thus ensures sufficient exertion of the drive performance of the motor.

A second method according to another aspect of the present invention is a method of setting a secondary battery in a power output apparatus, where the power output apparatus includes: at least one motor constructed to enable power input and power output from and to at least one driveshaft; a power source constructed to output power; at least one generator constructed to enable power generation by using the output power of the power source, while the motor outputs power to the driveshaft; and the secondary battery designed to enable transmission of electric power to and from any of the at least one motor and the at least one generator. The method sets a performance of the secondary battery to have an electrode satisfying a condition that a ratio of a total electrode area to a total of a sum of rated output of all the at least one motor in regenerative operation and a sum of rated output of all the at least one generator is not less than a second predetermined ratio.

The second method of setting the secondary battery according to this aspect of the invention sets the performance of the secondary battery to have the electrode satisfying the condition that the ratio of the total electrode area to the total of the sum of rated output of all the at least one motor in regenerative operation and the sum of rated output of all the at least one generator is not less than the second predetermined ratio. The secondary battery has the performance corresponding to the power generation performances of the motor and the generator and thus ensures sufficient exertion of the power generation performances of the motor and the generator.

A third method according to another aspect of the present invention is a method of setting a secondary battery in a power output apparatus, where the power output apparatus includes: at least one motor constructed to enable power input and power output from and to at least one driveshaft; a power source constructed to output power; at least one generator constructed to enable power generation by using the output power of the power source, while the motor outputs power to the driveshaft; and the secondary battery designed to enable transmission of electric power to and from any of the at least one motor and the at least one generator. The method sets a performance of the secondary battery to have an electrode satisfying a condition that a ratio of a total electrode area to a sum of rated output of all the at least one motor in power operation is not less than a first predetermined ratio and a condition that a ratio of the total electrode area to a total of a sum of rated output of all the at least one motor in regenerative operation and a sum of rated output of all the at least one generator is not less than a second predetermined ratio.

The third method of setting the secondary battery according to this aspect of the invention sets the performance of the secondary battery to have the electrode satisfying the condition that the ratio of the total electrode area to the sum of rated output of all the at least one motor in power operation is not less than the first predetermined ratio and the condition that the ratio of the total electrode area to the total of the sum of rated output of all the at least one motor in regenerative operation and the sum of rated output of all the at least one generator is not less than the second predetermined ratio. The secondary battery has the performances corresponding to the drive performance of the motor and the power generation performances of the motor and the generator and thus ensures sufficient exertion of the drive performance of the motor as well as the power generation performances of the motor and the generator.

BEST MODES OF CARRYING OUT THE INVENTION

Figure 1:
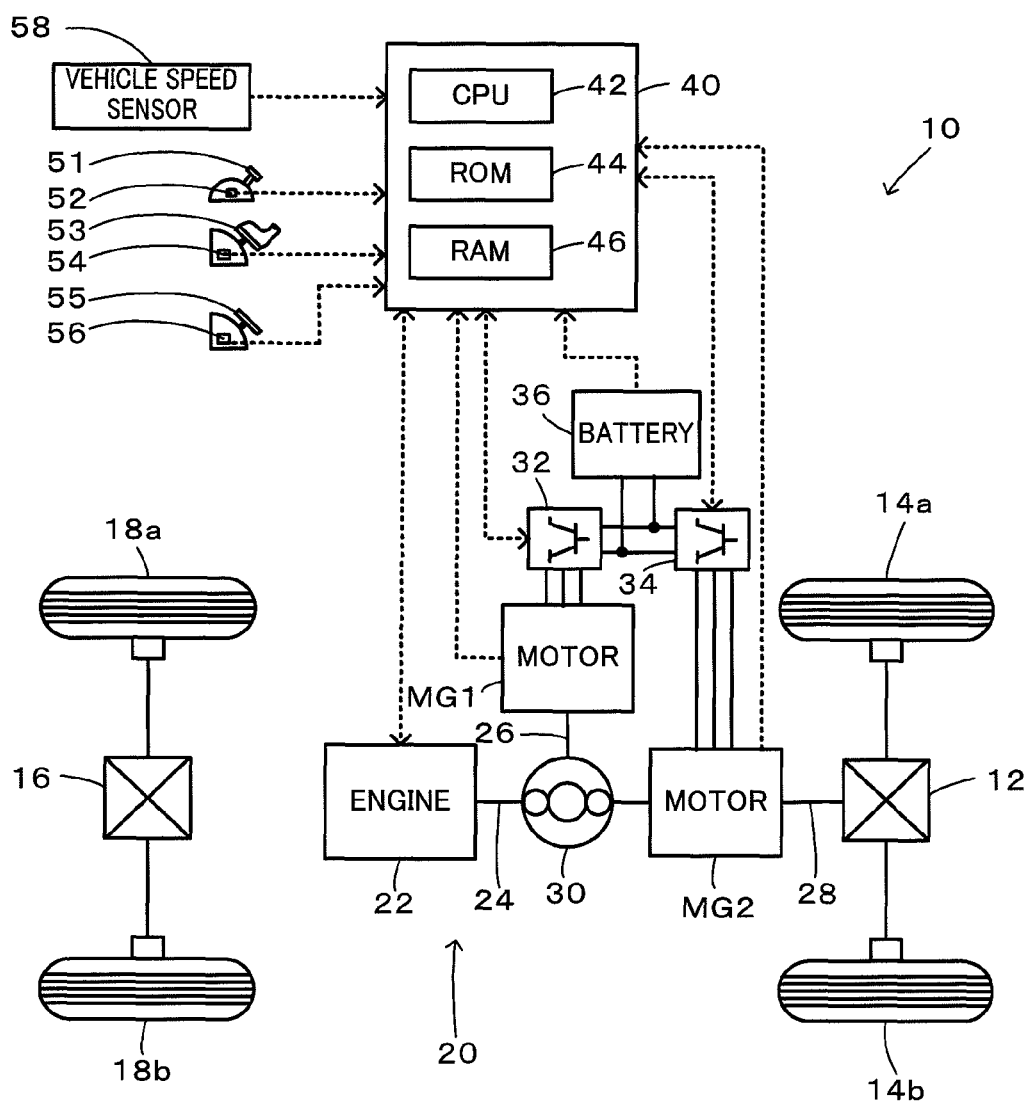
FIG. 1 schematically illustrates the configuration of a hybrid vehicle 10 equipped with a power output apparatus 20 in one embodiment of the invention.

One mode of carrying out the invention is described below as a preferred embodiment with reference to the accompanied drawings. FIG. 1 schematically illustrates the configuration of a hybrid vehicle 10 equipped with a power output apparatus 20 in one embodiment of the invention. As illustrated, the hybrid vehicle 10 of the embodiment includes an engine 22 constructed as an internal combustion engine to output power by consumption of a hydrocarbon fuel, such as gasoline or light oil, a planetary gear mechanism 30 arranged to have a sun gear connected with a crankshaft 24 or an output shaft of the engine 22 via a non-illustrated damper and a ring gear connected with a driveshaft 28 linked to front wheels 14a and 14b via a differential gear 12, a motor MG1 arranged to have a rotating shaft 26 connected with a carrier of the planetary gear mechanism 30 and have power generation capability, a motor MG2 arranged to input and output power from and to the driveshaft 28, a battery 36 constructed to transmit electric power to and from the motors MG1 and MG2 via respective inverters 32 and 34, and an electronic control unit 40 configured to control the operations of the whole hybrid vehicle 10. In the hybrid vehicle 10 of the embodiment, rear wheels 18a and 18b connected via a differential gear 16 work as driven wheels.

The motors MG1 and MG2 are constructed as known synchronous motor generators to enable operations as both a generator and a motor. The motors MG1 and MG2 transmit electric power to and from the battery 36 via the inverters 32 and 34. Power lines connecting the battery 36 with the inverters 32 and 34 are structured as common positive bus and negative bus shared by the inverters 32 and 34. Such connection enables electric power generated by one of the motors MG1 and MG2 to be consumed by the other motor MG2 or MG1. The battery 36 may thus be charged with surplus electric power generated by either of the motors MG1 and MG2, while being discharged to supplement insufficient electric power. The battery 36 is neither charged nor discharged upon the balance of the input and output of electric powers between the motors MG1 and MG2.

The battery 36 is a lithium ion battery designed to satisfy a relation of $Sb/Pm2max > 0.09$ (m²/kW) as a first requirement and a relation of $Sb/(|Pm1min| + Pm2min|) > 0.04$ (m²/kW) as a second requirement. Sb denotes a total electrode area of the battery and is equal to the smaller between a total electrode area S1 of a positive electrode and a total electrode area S2 of a negative electrode. Pm2max, Pm1min, and Pm2min respectively represent a rated output (maximum output) of the motor MG2 in power operation, a rated output of the motor MG1 in regenerative operation, and a rated output of the motor MG2 in regenerative operation. The first requirement and the second requirement will be discussed later in detail.

The electronic control unit 40 is constructed as a microprocessor including a CPU 42, a ROM 44 configured to store processing programs, a RAM 46 configured to temporarily store data, input and output ports (not shown), and a communication port (not shown). The electronic control unit 40 inputs, via its input port, a gearshift position SP or a current setting position of a gearshift lever 51 from a gearshift position sensor 52, an accelerator opening Acc or the driver's depression amount of an accelerator pedal 53 from an accelerator pedal position sensor 54, a brake pedal position BP or the driver's depression amount of a brake pedal 55 from a brake pedal position sensor 56, a vehicle speed V from a vehicle speed sensor 58, and motor rotation speeds from rotation speed sensors (not shown) attached to the motors MG1 and MG2. The operations of the engine 22 and the motors MG1 and MG2 are controlled, based on these input data.

The hybrid vehicle 10 of the embodiment constructed as described above computes a torque demand to be output to the driveshaft 28, based on the vehicle speed V and the accelerator opening Acc corresponding to the driver's depression amount of the accelerator pedal 53 and controls the operations of the engine 22 and the motors MG1 and MG2 to ensure output of a power demand corresponding to the computed torque demand to the driveshaft 28. There are several drive control modes of the engine 22 and the motors MG1 and MG2. In a torque conversion drive mode, while the engine 22 is driven and controlled to output a required level of power corresponding to the power demand, the motors MG1 and MG2 are driven and controlled to enable all the output power of the engine 22 to be subjected to torque conversion by the planetary gear mechanism 30 and the motors MG1 and MG2 and to be output to the driveshaft 28. In a charge-discharge drive mode, the engine 22 is driven and controlled to output a required level of power corresponding to the sum of the power demand and electric power used to charge the battery 36 or discharged from the battery 36. The motors MG1 and MG2 are driven and controlled to enable all or part of the output power of the engine 22, which is equivalent to the power demand with charge or discharge of the battery 36, to be subjected to torque conversion by the planetary gear mechanism 30 and the motors MG1 and MG2 and to be output to the driveshaft 28. In a motor drive mode, the motor MG2 is driven and controlled to ensure output of a required level of power corresponding to the power demand to the driveshaft 28, while the engine 22 stops its operation.

Figure 2:
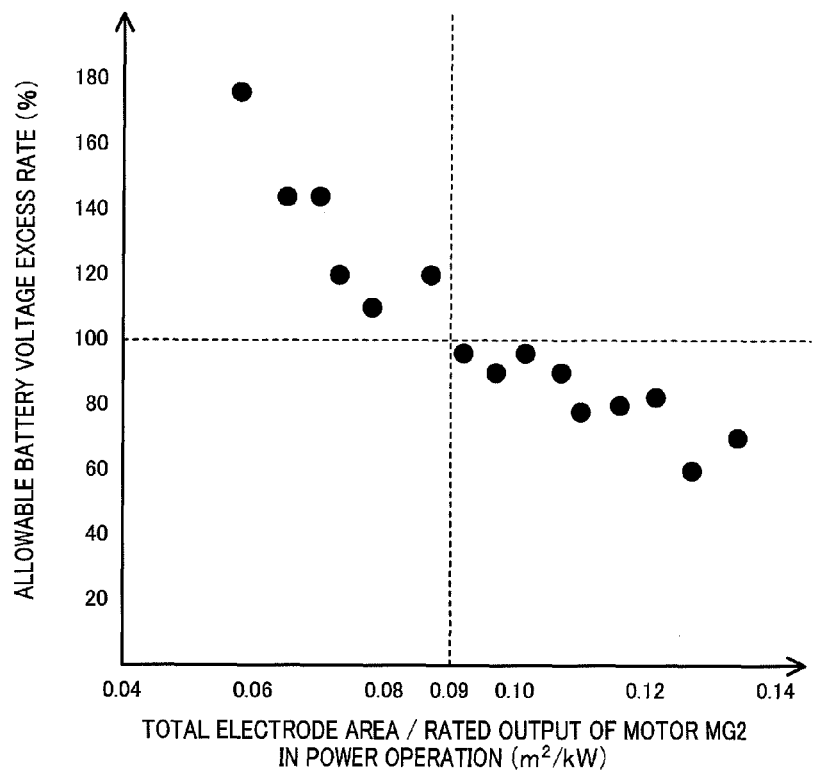
FIG. 2 shows a variation in allowable battery voltage excess rate representing an excess ratio of an allowable voltage of a battery 36 against a ratio of a total electrode area Sb of the battery 36 to a rated output of a motor MG2 in power operation.
Figure 3:
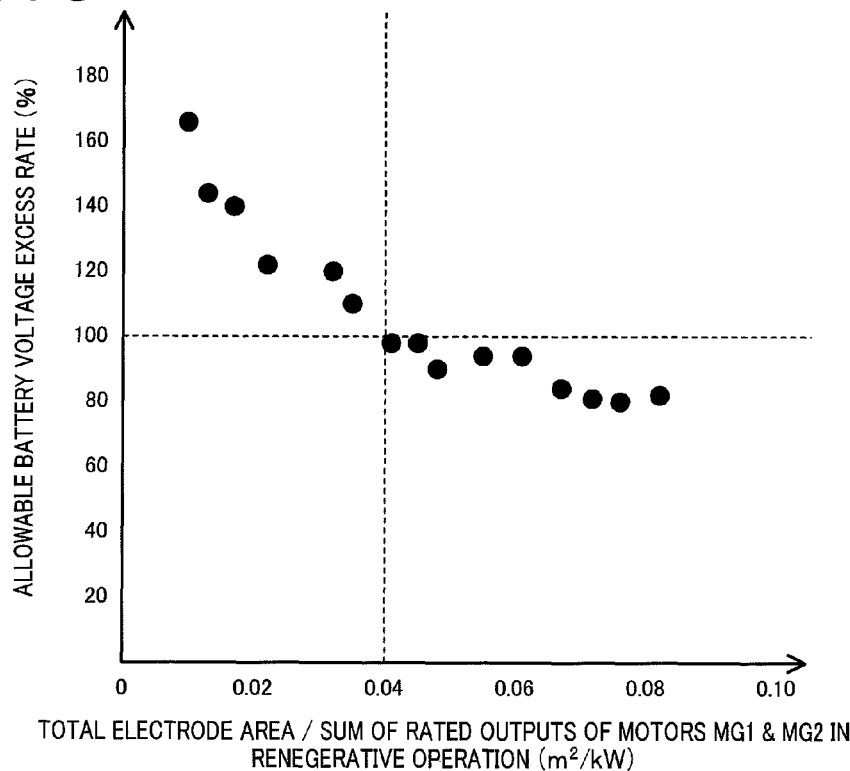
FIG. 3 shows a variation in allowable battery voltage excess rate representing the excess ratio of the allowable voltage of the battery 36 against a ratio of the total electrode area Sb of the battery 36 to the sum of rated outputs of motors MG1 and MG2 in regenerative operation.

There is the relation between the battery 36 and the motors MG1 and MG2 as discussed below. A secondary battery, for example, a lithium ion battery like the battery 36 in the embodiment is charged and discharged by electrode reactions on the positive electrode and on the negative electrode. The maximum charging power and the maximum discharging power thus depend upon the electrode area. The electrode reactions are the chemical reactions and are affected by the temperature condition. Namely the maximum charging power and the maximum discharging power of a battery having a fixed electrode area are varied according to the battery temperature. In general, both the charging power and the discharging power decrease with a decrease in battery temperature. The motor MG2 may be driven in the motor drive mode to output a maximum torque at low temperatures, for example, −20° C. In this case, output of the rated power from the battery 36 to the motor MG2 is required even in such a low temperature condition. The power output apparatus 20 of the embodiment is assumed to be mounted on a general automobile. The condition required for enabling output of the rated power from the battery 36 to the motor MG2 at low temperatures is determinable as a relation of the total electrode area Sb of the battery to the rated output Pm2max of the motor MG2 in power operation. The required condition is Sb/Pm2max>0.09 ($m^2$/kW) for a lithium ion battery adopted for the battery 36. This is given as the first requirement. FIG. 2 shows a variation in allowable battery voltage excess rate representing an excess ratio of an allowable voltage of the battery 36 against the ratio (Sb/Pm2max) of the total electrode area Sb of the battery 36 to the rated output Pm2max of the motor MG2 in power operation. As illustrated, the allowable battery voltage excess rate is less than 100% in a range of the ratio (Sb/Pm2max) exceeding 0.09 ($m^2$/kW). This ensures output of the rated power Pm2max from the motor MG2 in power operation in the range of the allowable voltage the battery 36. It is then assumed that the front wheels 14a and 14b have a skid at a start of the hybrid vehicle 10 with the driver's depression of the accelerator pedal 53. At the start of the hybrid vehicle 10 with the driver's depression of the accelerator pedal 53, while the engine 22 is driven, the motor MG1 is under regenerative control with a large regenerative torque and the motor MG2 outputs a large torque for a start. The skid of the front wheels 14a and 14b in this state leads to a slip of the front wheels 14a and 14b. In the event of a grip of the slipping front wheels 14a and 14b by some reason causes instantaneous regenerative control of the motor MG2. The battery 36 is thus instantaneously charged with both the regenerative power of the motor MG1 and the regenerative power of the motor MG2. The condition required for enabling the battery 36 to be instantaneously charged with both the regenerative power of the motor MG1 and the regenerative power of the motor MG2 is determinable as a relation of the total electrode area Sb of the battery to the sum of the rated output Pm1min of the motor MG1 in regenerative operation and the rated output Pm2min of the motor MG2 in regenerative operation. The required condition is Sb/(|Pm1min+Pm2min|)>0.04 ($m^2$/kW) for a lithium ion battery adopted for the battery 36. This is given as the second requirement. FIG. 3 shows a variation in allowable battery voltage excess rate representing the excess ratio of the allowable voltage of the battery 36 against the ratio (Sb/|Pm1min+Pm2min|) of the total electrode area Sb of the battery 36 to the absolute value of the sum of rated outputs Pm1min and Pm2min of the motors MG1 and MG2 in regenerative operation. As illustrated, the allowable battery voltage excess rate is less than 100% in a range of the ratio (Sb/|Pm1min+Pm2min|) exceeding 0.04 ($m^2$/kW). This ensures output of the rated powers Pm1min and Pm2min from the motor MG1 and from the motor MG2 in generative operation in the range of the allowable voltage of the battery 36. The battery 36 of the embodiment is thus constructed by the lithium ion battery having the electrode conditions satisfying both the first requirement of Sb/Pm2max>0.09 ($m^2$/kW) and the second requirement of Sb/(|Pm1min+Pm2min|)>0.04 ($m^2$/kW). These electrode conditions ensure sufficient exertion of the drive characteristics of the motor MG2 and the power generation characteristics of both the motors MG1 and MG2. The battery 36 of the embodiment is designed to have the minimum possible area as the total electrode area Sb in a specific range satisfying both the first requirement and the second requirement. Such design minimizes the size of the battery 36 while ensuring sufficient exertion of the performances of both the motors MG1 and MG2.

In the hybrid vehicle 10 equipped with the power output apparatus 20 of the embodiment described above, the battery 36 is constructed by the lithium ion battery satisfying the first requirement of Sb/Pm2max>0.09 ($m^2$/kW) as the relation of the total electrode area Sb of the battery to the rated output Pm2max of the motor MG2 in power operation and the second requirement of Sb/(|Pm1min+Pm2min|)>0.04 ($m^2$/kW) as the relation of the total electrode area Sb of the battery to the sum of the rated output Pm1min of the motor MG1 in regenerative operation and the rated output Pm2min of the motor MG2 in regenerative operation. The lithium ion battery satisfying the first requirement and the second requirement ensures sufficient exertion of the drive characteristics of the motor MG2 and the power generation characteristics of both the motors MG1 and MG2. The battery 36 of the embodiment is designed to have the minimum possible area as the total electrode area Sb in the specific range satisfying both the first requirement and the second requirement. Such design ensures sufficient exertion of the performances of both the motors MG1 and MG2, while minimizing the size of the battery 36 and thereby effectively improving the fuel consumption of the vehicle.

The hybrid vehicle 10 equipped with the power output apparatus 20 of the embodiment uses the lithium battery ion for the battery 36. The battery 36 is, however, not restricted to the lithium ion battery but may be any of other various secondary batteries, for example, a nickel hydride battery. In application of another secondary battery, the first requirement of Sb/Pm2max>0.09 ($m^2$/kW) and the second requirement of Sb/(|Pm1min+Pm2min|)>0.04 ($m^2$/kW) are adjusted with a ratio of an amount of electric power per unit area of an electrode in discharge from or charge into the applied secondary battery at its maximum rated output to an amount of electric power per unit area of the electrode in discharge from or charge into the lithium ion battery at the maximum rated output.

Figure 4:
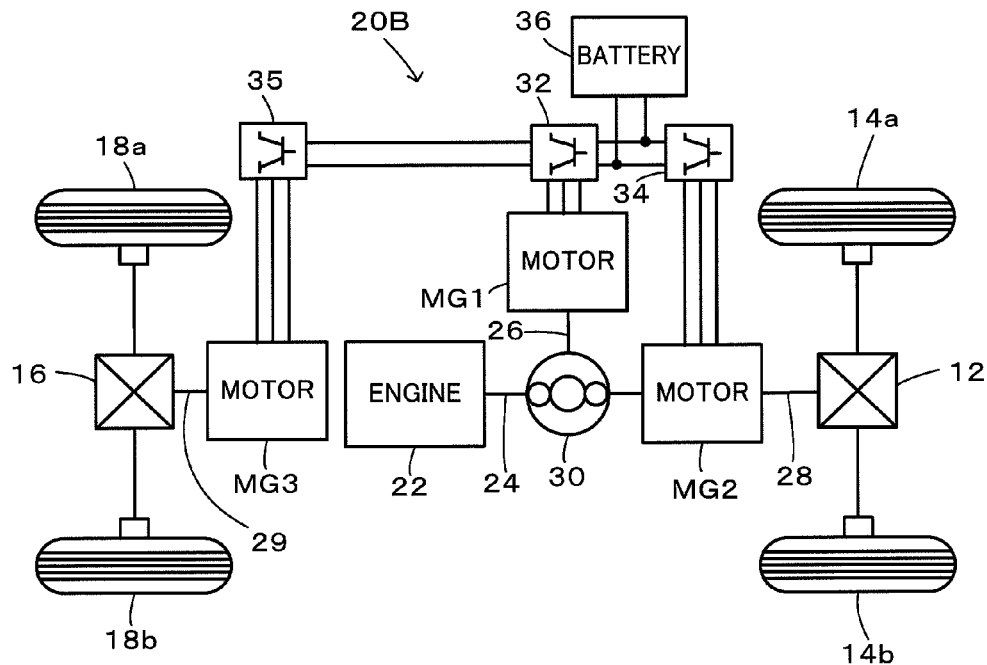
FIG. 4 shows the schematic configuration of another hybrid vehicle equipped with a power output apparatus 20B of one modified example.

The hybrid vehicle 10 equipped with the power output apparatus 20 of the embodiment has the engine 22, the planetary gear mechanism 30, the motors MG1 and MG2, and the battery 36 arranged to transmit electric power to and from the motors MG1 and MG2. This configuration of the vehicle is, however, not restrictive. The technique of the invention is also applicable to another hybrid vehicle equipped with a power output apparatus 20B of a modified configuration as shown in FIG. 4. The hybrid vehicle of this modified example has a motor MG3 connected with rear wheels 18a and 18b and configured to input and output power from and to a rear driveshaft 29 via a differential gear 16, in addition to the structure of the hybrid vehicle 10 of the embodiment. In this modified configuration, the first requirement is given by Sb(Pm2max+Pm3max)>0.09 ($m^2$/kW) as a relation of the total electrode area Sb of the battery to the sum of a rated output Pm3max of the motor MG3 in power operation and the rated output Pm2max of the motor MG2 in power operation. In general, the first requirement may be regarded as a ratio of the total electrode area Sb of the battery to a sum of rated outputs of all motors in power operation, which are arranged to enable power output to the driveshaft 28 or to the rear driveshaft 29. In the modified configuration, the second requirement is given by Sb/(|Pm1min+Pm2min+Pm3min|) >0.04 ($m^2$/kW) as a relation of the total electrode area Sb of the battery to the absolute value of the sum of a rated output Pm3min of the motor M3 in regenerative operation and the rated outputs Pm1min and Pm2min of the motors MG1 and MG2 in regenerative operation. In general, the second requirement may be regarded as a ratio of the total electrode area Sb of the battery to the absolute value of a sum of rated outputs of all the motors in regenerative operation.

Figure 5:
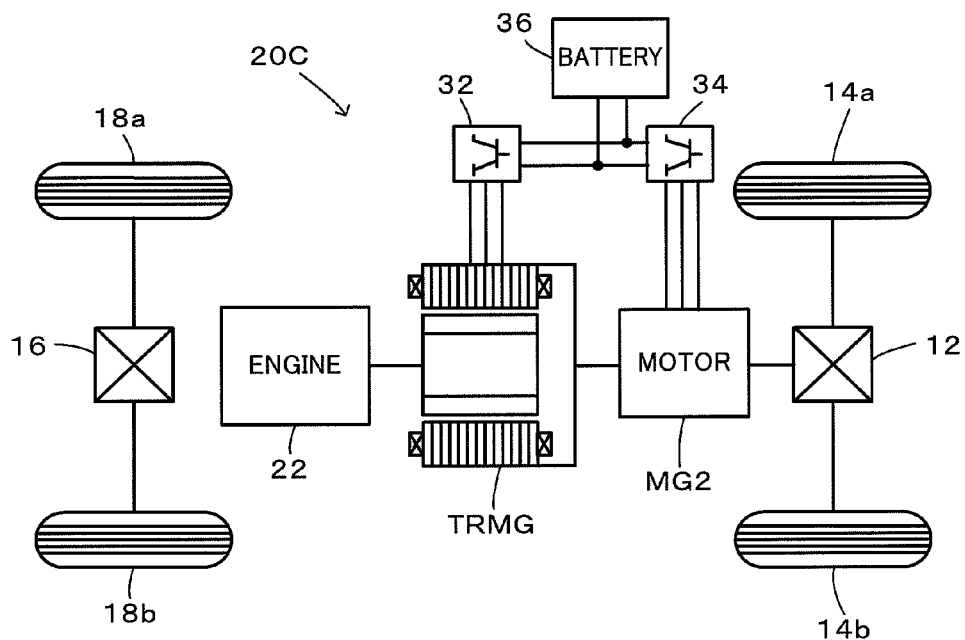
FIG. 5 shows the schematic configuration of still another hybrid vehicle equipped with a power output apparatus 20C of another modified example.
Figure 6:
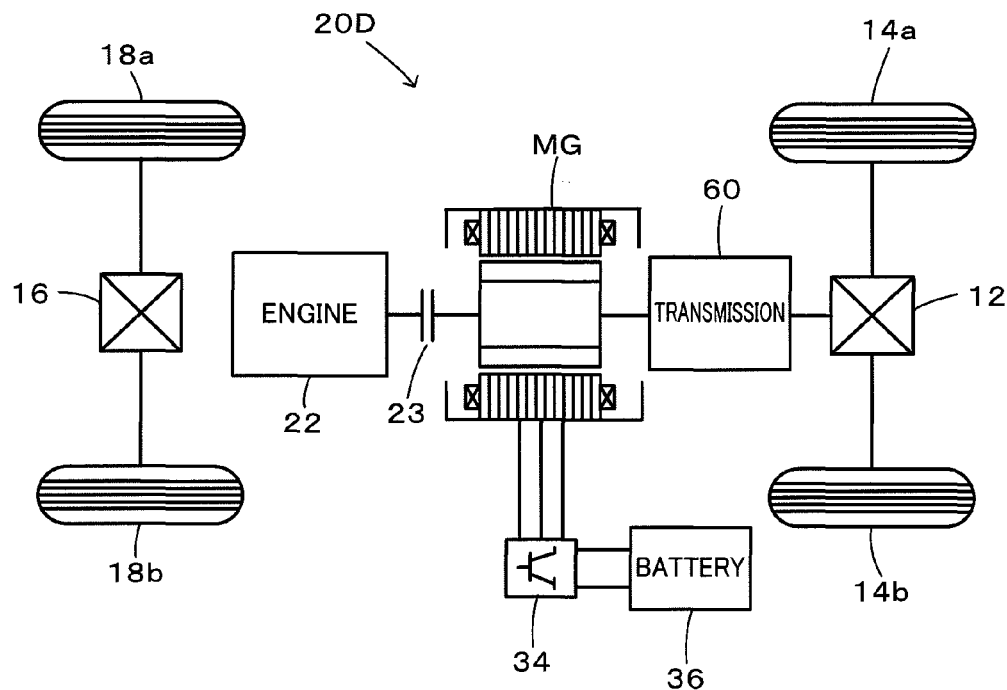
FIG. 6 shows the schematic configuration of another hybrid vehicle equipped with a power output apparatus 20D of still another modified example.
Figure 7:
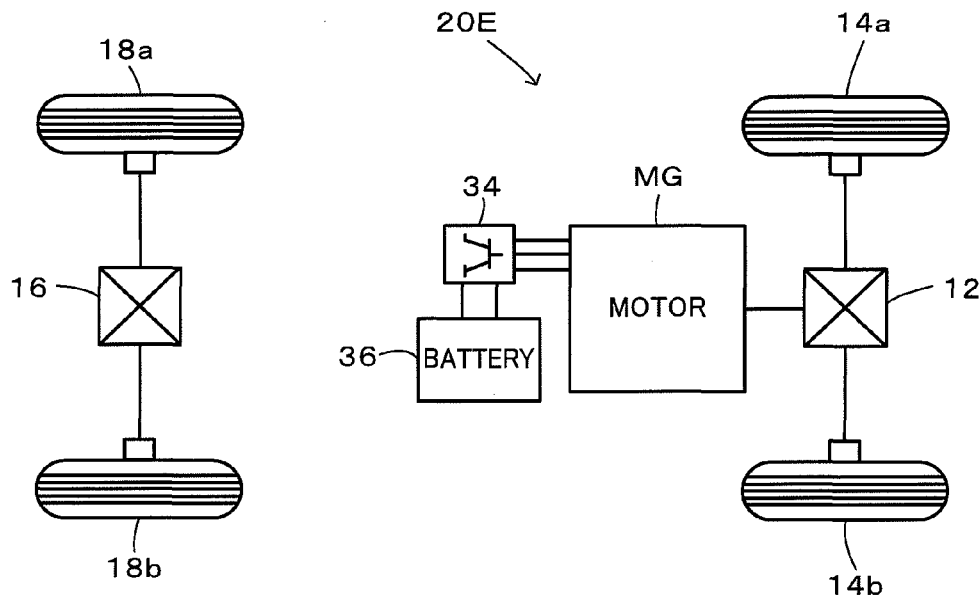
FIG. 7 shows the schematic configuration of still another hybrid vehicle equipped with a power output apparatus 20E of another modified example.

As mentioned above, the first requirement is generally expressible as the ratio of the total electrode area Sb of the battery to the sum of rated outputs of all motors in power operation, which are arranged to enable power output to the driveshaft 28 or to the rear driveshaft 29. The second requirement is generally expressible as the ratio of the total electrode area Sb of the battery to the absolute value of the sum of rated outputs of all the motors in regenerative operation. The first requirement and the second requirement are applicable to the battery 36 in another hybrid vehicle equipped with a power output apparatus 20C of one modified configuration where the planetary gear mechanism 30 and the motor MG1 are replaced by a pair-rotor motor TRMG with an outer rotor and an inner rotor as shown in FIG. 5. The first requirement and the second requirement are also applicable to the battery 36 in still another hybrid vehicle equipped with a power output apparatus 20D of another modified configuration where the engine 22 is separable by means of a clutch 23 and the output power of a motor MG is transmittable by a transmission 60 as shown in FIG. 6. The first requirement and the second requirement are further applicable to the battery 36 in another hybrid vehicle equipped with a power output apparatus 20E of still another modified configuration including only a motor MG as a driving power source with omission of the engine 22 as shown in FIG. 7. All the hybrid vehicle 10 equipped with the power output apparatus 20 of the embodiment shown in FIG. 1, the hybrid vehicle equipped with the power output apparatus 20B of the modified example shown in FIG. 4, the hybrid vehicle equipped with the power output apparatus 20C of the modified example shown in FIG. 5, the hybrid vehicle equipped with the power output apparatus 20D of the modified example shown in FIG. 6, and the hybrid vehicle equipped with the power output apparatus 20E of the modified example shown in FIG. 7 have the differential gears 12 and 16. The differential gears 12 and 16 may, however, be omitted when not required.

The hybrid vehicle 10 equipped with the power output apparatus 20 of the embodiment uses the lithium ion battery satisfying the first requirement of Sb/Pm2max>0.09 (m²/kW) and the second requirement of Sb/(|Pm1min+Pm2min|) >0.04 (m²/kW) for the battery 36. The lithium ion battery used for the battery 36 may satisfy only the first requirement of Sb/Pm2max>0.09 (m²/kW) while dissatisfying the second requirement of Sb/(|Pm1min+Pm2min|)>0.04 (m²/kW). The lithium ion battery used for the battery 36 may otherwise satisfy only the second requirement of Sb/(|Pm1min+Pm2min|)>0.04 (m²/kW) while dissatisfying the first requirement of Sb/Pm2max>0.09 (m²/kW).

The embodiment discussed above regards the hybrid vehicle 10 equipped with the power output apparatus 20. The technique of the invention is also applicable to a secondary battery used for a power output apparatus that is not mounted on a hybrid vehicle or any other vehicle. The principle of the invention is not restricted to the power output apparatus 20 or the hybrid vehicle 10 but is also actualized by a method of setting a secondary battery.

The embodiment and its modified examples discussed above are to be considered in all aspects as illustrative and not restrictive. There may be many other modifications, changes, and alterations without departing from the scope or spirit of the main characteristics of the present invention.

INDUSTRIAL APPLICABILITY

The technique of the present invention is preferably applied to the manufacturing industries of power output apparatuses and other relevant devices.

The invention claimed is:

1. A power output apparatus configured to output power to at least one driveshaft, the power output apparatus comprising:

at least one motor constructed to enable independent power input and power output from and to the at least one driveshaft; and a secondary battery designed to enable transmission of electric power to and from any of the at least one motor and to have an electrode satisfying a condition that a ratio of a total electrode area to a sum of rated output of all the at least one motor in power operation is not lower than a first predetermined ratio, wherein the first predetermined ratio is set to cause an allowable battery voltage excess rate or an excess ratio of an allowable voltage of the secondary battery is less than 100% in output of rated power from all the at least one motor in power operation, and wherein the secondary battery is a lithium ion battery, and the first predetermined ratio is 0.09 (m²/kW).

2. A power output apparatus configured to output power to at least one driveshaft, the power output apparatus comprising:

at least one motor constructed to enable independent power input and power output from and to the at least one driveshaft;

a power source constructed to output power;

at least one generator constructed to enable power generation by using the output power of the power source, while the motor outputs power to the driveshaft; and a secondary battery designed to enable transmission of electric power to and from any of the at least one motor and the at least one generator and to have an electrode satisfying a condition that a ratio of a total electrode area to a total of a sum of rated output of all the at least one motor in regenerative operation and a sum of rated output of all the at least one generator is not less than a predetermined ratio, wherein the predetermined ratio is set to cause an allowable battery voltage excess rate or an excess ratio of an allowable voltage of the secondary battery is less than 100% in output of rated power from all the at least one motor in regenerative operation and output of rated power from all the at least one generator, and wherein the secondary battery is a lithium ion battery, and the predetermined ratio is 0.04 (m²/kW).

3. The power output apparatus in accordance with claim 2, the power output apparatus further having:

a three shaft-type power input output assembly connected with three shafts, an output shaft of the power source, the driveshaft, and a rotating shaft of the generator, and designed to input and output power from and to a residual shaft based on powers input from and output to any two shafts among the three shafts.

4. A power output apparatus configured to output power to at least one driveshaft, the power output apparatus comprising:

at least one motor constructed to enable independent power input and power output from and to the at least one driveshaft;

a power source constructed to output power;

at least one generator constructed to enable power generation by using the output power of the power source, while the motor outputs power to the driveshaft; and a secondary battery designed to enable transmission of electric power to and from any of the at least one motor and the at least one generator and to have an electrode satisfying a condition that a ratio of a total electrode area to a sum of rated output of all the at least one motor in power operation is not less than a first predetermined ratio and a condition that a ratio of the total electrode area to a total of a sum of rated output of all the at least one motor in regenerative operation and a sum of rated output of all the at least one generator is not less than a second predetermined ratio, wherein the first predetermined ratio is set to cause an allowable battery voltage excess rate or an excess ratio of an allowable voltage of the secondary battery is less than 100% in output of rated power from all the at least one motor in power operation, the second predetermined ratio is set to cause an allowable battery voltage excess rate or an excess ratio of an allowable voltage of the secondary battery is less than 100% in output of rated power from all the at least one motor in regenerative operation and output of rated power from all the at least one generator, and wherein the secondary battery is a lithium ion battery, and the first predetermined ratio is 0.09 ($m^2$/kW).

5. The power output apparatus in accordance with claim 4, wherein the second predetermined ratio is 0.04 ($m^2$/kW).

6. The power output apparatus in accordance with claim 4, the power output apparatus further having:

a three shaft-type power input output assembly connected with three shafts, an output shaft of the power source, the driveshaft, and a rotating shaft of the generator, and designed to input and output power from and to a residual shaft based on powers input from and output to any two shafts among the three shafts.

7. A method of setting a secondary battery in a power output apparatus, where the power output apparatus includes: at least one motor constructed to enable independent power input and power output from and to at least one driveshaft; and the secondary battery designed to enable transmission of electric power to and from any of the at least one motor, the method setting a performance of the secondary battery to have an electrode satisfying a condition that a ratio of a total electrode area to a sum of rated output of all the at least one motor in power operation is not lower than a first predetermined ratio, the first predetermined ratio being set to cause an allowable battery voltage excess rate or an excess ratio of an allowable voltage of the secondary battery is less than 100% in output of rated power from all the at least one motor in power operation, wherein the secondary battery is a lithium ion battery, and the first predetermined ratio is 0.09 ($m^2$/kW).

8. A method of setting a secondary battery in a power output apparatus, where the power output apparatus includes: at least one motor constructed to enable independent power input and power output from and to at least one driveshaft; a power source constructed to output power; at least one generator constructed to enable power generation by using the output power of the power source, while the motor outputs power to the driveshaft; and the secondary battery designed to enable transmission of electric power to and from any of the at least one motor and the at least one generator, the method setting a performance of the secondary battery to have an electrode satisfying a condition that a ratio of a total electrode area to a total of a sum of rated output of all the at least one motor in regenerative operation and a sum of rated output of all the at least one generator is not less than a predetermined ratio, the predetermined ratio being set to cause an allowable battery voltage excess rate or an excess ratio of an allowable voltage of the secondary battery is less than 100% in output of rated power from all the at least one motor in regenerative operation and output of rated power from all the at least one generator, wherein the secondary battery is a lithium ion battery, and the predetermined ratio is 0.04 ($m^2$/kW).

9. A method of setting a secondary battery in a power output apparatus, where the power output apparatus includes: at least one motor constructed to enable independent power input and power output from and to at least one driveshaft; a power source constructed to output power; at least one generator constructed to enable power generation by using the output power of the power source, while the motor outputs power to the driveshaft; and the secondary battery designed to enable transmission of electric power to and from any of the at least one motor and the at least one generator, the method setting a performance of the secondary battery to have an electrode satisfying a condition that a ratio of a total electrode area to a sum of rated output of all the at least one motor in power operation is not less than a first predetermined ratio and a condition that a ratio of the total electrode area to a total of a sum of rated output of all the at least one motor in regenerative operation and a sum of rated output of all the at least one generator is not less than a second predetermined ratio, the first predetermined ratio being set to cause an allowable battery voltage excess rate or an excess ratio of an allowable voltage of the secondary battery is less than 100% in output of rated power from all the at least one motor in power operation, and the second predetermined ratio being set to cause an allowable battery voltage excess rate or an excess ratio of an allowable voltage of the secondary battery is less than 100% in output of rated power from all the at least one motor in regenerative operation and output of rated power from all the at least one generator, wherein the secondary battery is a lithium ion battery, and the first predetermined ratio is 0.09 ($m^2$/kW).

* * * * *